United States Patent [19]

Silverman et al.

[11] Patent Number: 5,240,418
[45] Date of Patent: Aug. 31, 1993

[54] LEARNING SHOE FOR CHILDREN

[75] Inventors: Jeffrey Silverman, Scarsdale, N.Y.; Diane Wanamaker, Orem, Utah

[73] Assignee: Genesco Inc., Nashville, Tenn.

[21] Appl. No.: 665,281

[22] Filed: Mar. 6, 1991

[51] Int. Cl.⁵ ............................................. G09B 19/24
[52] U.S. Cl. ...................................... 434/260; 36/112
[58] Field of Search ............... 434/256, 260; 24/712.1, 24/712.9, 713; 36/112, 136

[56] References Cited

U.S. PATENT DOCUMENTS

| | | | |
|---|---|---|---|
| D. 117,765 | 11/1939 | Winchester . | |
| D. 237,069 | 10/1975 | Sammers . | |
| 1,331,914 | 2/1920 | Hall | 24/712.9 |
| 2,313,874 | 3/1943 | Hume | 35/1 |
| 2,385,197 | 9/1945 | Eisel | 35/1 |
| 2,624,957 | 1/1953 | Collins . | |
| 2,801,477 | 8/1957 | Adams et al. | 36/136 |
| 2,991,561 | 7/1961 | Moore et al. | 434/260 |
| 3,168,769 | 2/1965 | Smith | 24/713 |
| 3,258,858 | 7/1966 | Cariffe, Jr. | 36/1 |
| 3,906,642 | 9/1975 | Cohen | 35/8 |
| 3,930,331 | 1/1976 | Simeone | 46/1 R |
| 4,017,984 | 4/1977 | Bonfigli | 35/8 |
| 4,342,557 | 8/1982 | Bandar | 434/260 |
| 4,697,362 | 10/1987 | Wasserman | 36/136 |
| 4,712,319 | 12/1987 | Gloria | 36/137 |
| 4,721,468 | 1/1988 | Alexander et al. | 434/260 |
| 4,832,606 | 5/1989 | Clark et al. | 434/258 |
| 4,837,960 | 6/1989 | Skaja | 40/636 |

FOREIGN PATENT DOCUMENTS 2167592  5/1986  United Kingdom ................ 36/112

*Primary Examiner*—Gene Mancene
*Assistant Examiner*—Cindy A. Cherichetti
*Attorney, Agent, or Firm*—Lerner, David, Littenberg, Krumholz & Mentlik

[57] ABSTRACT

A pair of educational footwear teaches children all of the skills attendant to wearing footwear, particularly footwear having laces. Indicia on the exterior of the footwear which face one another when the footwear is properly aligned for wearing teach children how to accomplish the task of putting the left item of footwear on the left foot and the right item of footwear on the right foot; a bi-colored lace cooperates with color-coded eyelets to teach children how to properly lace the footwear; and a retaining device holds one end of the lace in a looped configuration to make it much easier for a child to tie the lace with a bowknot. All of these features combine in an inconspicuous manner, and therefore may be incorporated in any type of footwear for daily wear.

19 Claims, 3 Drawing Sheets

LEARNING SHOE FOR CHILDREN

FIELD OF THE INVENTION

This invention relates generally to children's footwear, and more particularly to educational footwear for teaching young children the skills and procedures involved in learning to wear footwear, particularly footwear having laces. Accordingly, the footwear of the present invention helps young children learn the individual skills required to put items of footwear on the proper foot, to lace footwear without adult assistance and to tie the laces to form a single bowknot without adult help.

BACKGROUND OF THE INVENTION

Young children often have a difficult time learning and acquiring the skills associated with wearing footwear, especially shoes, sneakers and other footwear having laces. Namely, young children must learn relatively difficult tasks including how to put items of footwear on the proper foot, how to properly lace footwear, and how to tie the laces to form a single bowknot. Various reasons are extant for children's difficulties in mastering these tasks. One reason is the different rate, i.e., time frame, at which children acquire the various skills attendant to wearing footwear. For example, in order to properly orient conventional footwear for wearing, children must possess not only motor skills such as the eye-hand coordination needed to place an item of footwear on a foot, but also a sufficient degree of intellectual sophistication to be able to visually discriminate the subtle differences between a left item of footwear and a right item of footwear, and to understand the concepts of symmetry and directionality. Children acquire the necessary motor skills for putting on footwear much more rapidly than they acquire the necessary level of intellectual sophistication. The result is that, while being physically able to put on items of footwear, children frequently place the footwear on the wrong feet. This causes problems which both parents and the children would like to avoid. From the child's perspective, wearing his or her footwear on the wrong feet will be clumsy, embarrassing and uncomfortable. The parents' concerns are even more far-reaching, going to the growth and development of the child's foot and leg, as well as the development of proper walking form, balance, and other such skills.

Moreover, with the increasing popularity of "laceless" footwear such as footwear secured by Velcro fasteners, young children today are not learning the essential lacing and tying skills associated with wearing laced footwear as early as children had learned these skills in the past when such fasteners were not available. The complex tasks referred to above are relatively difficult for a young child to master and are often a source of frustration. Because of these difficulties, a young child may tend to dislike wearing footwear having laces and, as a result, will not desire to learn the essential skills associated with wearing such footwear.

Parents desire that their children learn to properly put on, lace and tie the laces of their footwear in a bowknot not only so the children are able to put on their own footwear, and in particular footwear having laces, and thus save time for their parents, but for a variety of other reasons which include fostering the development of motor skills and dexterity, and teaching the independence and self-confidence which comes with mastering a series of complex tasks. Thus, parents currently desire a comprehensive learning and educational aid which will assist their children with all of the difficult tasks associated with the wearing of footwear, and especially footwear having laces. Obviously, it would be preferable if such an educational or learning aid not only effectively and easily teaches all of the necessary skills involved in wearing footwear, but if it does so in a manner which will be fun for children. This is accomplished in a preferred embodiment of the present invention through the use of fanciful, aesthetic designs and colors intended to be pleasing to a child as well as an adult. Further, the overall appearance of the footwear of this invention when worn on young children's feet is no different than ordinary children's footwear.

Prior art devices have failed to provide the benefits of the present invention. In particular, such devices have typically addressed the aforementioned child development and educational skills, if at all, only on a piecemeal basis. The consequence of this failure is manifest by the structural design of such footwear which employs incompatible devices to teach children the entire range of skills required for wearing footwear, and particularly footwear having laces.

For example, Cariffe, Jr., U.S. Pat. No. 3,258,858, discloses a pair of shoes having a design which is intended to help children properly align the shoes for wearing on the correct feet. One-half of the design is visibly located on the insole of the left shoe, and the other half of the design is visibly located on the insole of the right shoe. Juxtaposing the design halves to form a complete picture will cause the shoes to be aligned for wearing with the right shoe on the right side and the left shoe on the left side. However, once a child has inserted his feet into the shoes, the designs will no longer be visible and, hence, there will no longer be any way for the child to determine whether the shoes are on the proper feet. Moreover, the approach taken by this patentee still requires the child to have a sufficient understanding of the concepts of symmetry and directionality to be able to mentally joint the design halves to form a complete picture.

Other prior art devices have addressed either the lacing of shoes or tying of shoelaces, but not both. Thus, in Hume, U.S. Pat. No. 2,313,874, the tips of shoelaces are color-coded to correspond with color-coded eyelets to facilitate the lacing of the shoe and to make sure that each lace is placed through each color-coded and corresponding eyelet in the proper order. This disclosure fails to teach children how to differentiate the right shoe from the left shoe and additionally does not attempt to teach children how to tie the shoelaces into a single bowknot once the shoes have been properly laced.

In Eisel, U.S. Pat. No. 2,385,197, an educational lacing toy employing a bi-colored shoelace is intended to teach very young children how to lace a pair of shoes by increasing their interests in such skills. However, Eisel increases the interests of children in lacing in the context of a device that either a child or his or her parent can easily restore after it has been unlaced. Eisel thus fails to provide a comprehensive system for teaching children all of the skills associated with wearing footwear having laces. The fact that the device of Eisel is in the form of a toy detracts from its usefulness, since a young child may not be capable of readily switching from lacing this toy to lacing actual footwear. Such child may thus encounter difficulties lacing actual footwear when he has learned this skill specifically on a model or toy as provided in Eisel.

In Bandar, U.S. Pat. No. 4,342,557, a device for tying a double-knotted bow is disclosed which is used as an educational toy for teaching young children how to tie with "bunny-ears" a double-knotted bow with their shoelaces. This device, which is wholly separate from the footwear with which it is to be used, consists of a plastic member having four linearly arranged apertures. After an overhand knot has been formed in the shoelace, the device is placed over the shoe and each end of the shoelace is threaded upwardly and then downwardly through an innermost aperture to form a pair of loops, and then upwardly through an outermost aperture to be held in the proper orientation. The two loops which are thus formed are held in place, and can then be more easily tied by a child. Thereafter, the plastic member is completely removed from the footwear. This device is impractical because of the need to keep the plastic member close at hand. Thus, if a child does not have or cannot locate the plastic member, he cannot use it to assist him in tying his laces. Furthermore, for the device to be effective, children must carry the plastic member at all times in the event that their laces become untied or they wish to take off their footwear and subsequently put the footwear back on. Additionally, the removal of the plastic member from the laces may loosen or even undo the bowknot that has just been tied.

Although each of these above-identified toys and devices of the prior art are aimed at young children who are learning to put on, tie or lace footwear, these devices still require such children to have already achieved a sufficient degree of intellectual sophistication that they are able to either appreciate the subtle visible differences between a left item of footwear and a right item of footwear or understand the concepts of symmetry and directionality. Hence, the children's footwear industry has generally failed to provide an adequate and comprehensive solution to assist children without such intellectual capabilities in all of the necessary skills associated with learning to wear footwear, particularly laced footwear. These skills include putting the items of footwear on the proper foot, lacing the footwear, and tying the laces to form a single bowknot.

There therefore exists a need for a comprehensive device which will teach young children all of those skills attendant to properly putting on, lacing and tying footwear. Preferably, the features required to teach all of these skills can be incorporated in a single pair of footwear so that the skills can be learned in the context in which they will be used. Even more preferably, these features will be incorporated in the pair of footwear in an inconspicuous manner so that the footwear will still be fashionable and capable of being worn on a daily basis, thereby not placing an additional economic burden on parents.

SUMMARY OF THE INVENTION

The aforementioned needs have now been addressed by the present invention of improved educational footwear which helps young children learn all of the skills needed for wearing footwear, and especially that footwear having laces. Importantly, the improved educational footwear of the present invention does not require children to recognize how the footwear is visually different, nor understand symmetry or directionality of any kind as a predicate to the successful wearing of the present footwear.

One aspect of the present invention provides a pair of footwear for educating a child comprising a right item of footwear shaped to fit the right foot of the child and a left item of footwear shaped to fit the left foot of the child. Each of the right and left items of footwear have an upper portion, a bottom portion, a lateral portion and an instep portion, the instep portions having an indicia disposed thereon so that the indicia will visibly oppose one another when the right and left items of footwear are properly aligned with the left item of footwear on the left and the right item of footwear on the right. This configuration thus teaches the child to properly orient the pair of footwear for wearing without having to visually differentiate the right item of footwear from the left item of footwear. Preferably, each of the right and left items of footwear include a lower sole secured to the bottom portion and having a peripheral exterior surface on which the indicia is visibly disposed.

In accordance with another aspect of the present invention, the pair of educational footwear consists of a right item of footwear shaped to fit the right foot of the child and a left item of footwear shaped to fit the left foot of the child. Each of the right and left items of footwear have an upper portion, a bottom portion, a lateral portion, an instep portion, a plurality of opposed lacing eyelets formed on the upper portion and a lace having first and second end portions threadedly engaged through the plurality of opposed lacing eyelets. A retaining device is provided on each item of footwear for removably receiving one of the first and second end portions of the lace so that when the child forms the lace into a loop, the retaining device will assist the child by retaining the looped configuration while the child ties the lace with a bowknot. In preferred embodiments, the retaining device is disposed on the lateral portion of the left item of footwear, and the instep portion of the right item of footwear. In highly preferred embodiments, the retaining device consists of an aperture sized and shaped to snugly receive one of the end portions of the lace.

In accordance with yet another aspect of the present invention, a pair of educational footwear for a child consists of a right item of footwear shaped to fit the right foot of the child and a left item of footwear shaped to fit the left foot of the child. Each of the right and left items of footwear have an upper portion, a bottom portion, a lateral portion, an instep portion, a plurality of opposed lacing eyelets formed on the upper portion and a lace having first and second end portions threadedly engaged through the plurality of opposed lacing eyelets. An indicia is disposed on the instep portion of each item of footwear so that the indicia will visibly oppose one another when the right and the left items of footwear are properly aligned with the left item of footwear on the left and the right item of footwear on the right. This arrangement teaches the child to properly orient the pair of footwear for wearing. In addition, each item of footwear includes a retaining device for removably receiving one of the first and second end portions of the lace so that when the child forms the lace into a loop, the retaining device will assist the child by retaining the looped configuration while the child ties the lace with a bowknot.

Preferably, the retaining device for removably receiving the one of the first and second end portions of the lace is disposed on the lateral portion of the left item of footwear and the instep portion of the right item of footwear. More preferably, the retaining device consists of an aperture sized and shaped to snugly receive one of the end portions of the lace.

A still further aspect of the present invention provides a pair of educational footwear for a child consisting of a right item of footwear shaped to fit the right foot of the child and a left item of footwear shaped to fit the left foot of the child. Each of the right and left items of footwear have an upper portion, a bottom portion, a lateral portion, an instep portion, a plurality of opposed lacing eyelets formed on the upper portion and a lace having first and second end portions threadedly engaged through the plurality of opposed lacing eyelets. A sleeve centrally disposed on the lace is sized and shaped to not pass through the plurality of opposed lacing eyelets. Additionally, an indicia is disposed on the instep portion of each item of footwear so that the indicia will visibly oppose one another when the right and the left items of footwear are properly aligned with the left item of footwear on the left and the right item of footwear on the right to again teach the child to properly orient the pair of footwear for wearing. Each item of footwear also includes a retaining device for removably receiving one of the first and second end portions of the lace so that when the child forms the lace into a loop, the retaining device will help the child by retaining the lace in the looped configuration while the child ties the lace with a bowknot. In preferred embodiments, the plurality of opposed lacing eyelets have a first geometric shape and the sleeve has a second geometric shape different than the first geometric shape.

Yet another aspect of the present invention provides a method for tying the first and second end portions of a lace in a pair of educational footwear having a retaining device for removably receiving one of the first and second end portions of the lace. According to the method, the first end portion of the lace is crossed over and then under the second end portion of the lace to form a half-knot which is tightened by pulling the first and second end portions of the lace in opposite directions. One of the first and second end portions of the lace is then removably assembled to the retaining device to form a first major loop. Another of the first and second end portions of the lace is initially wrapped around the first major loop to form an intermediate loop, and an intermediate section thereof is then inserted through the intermediate loop to form a second major loop. The intermediate loop is subsequently tightened by pulling the first and second major loops in opposite directions.

In preferred methods in accordance with this aspect of the present invention, the step of pulling the first and second major loops in opposite directions disassembles the one of the first and second end portions of the lace from the retaining device.

DETAILED DESCRIPTION OF A PREFERRED EMBODIMENT

In the detailed description which follows, the features of the present invention will be described as applied to a pair of athletic shoes or sneakers. However, it will be appreciated that the various features of the present invention may be readily and inconspicuously incorporated in other forms of children's footwear, including dress shoes, slippers, hiking shoes and the like.

Figure 1:
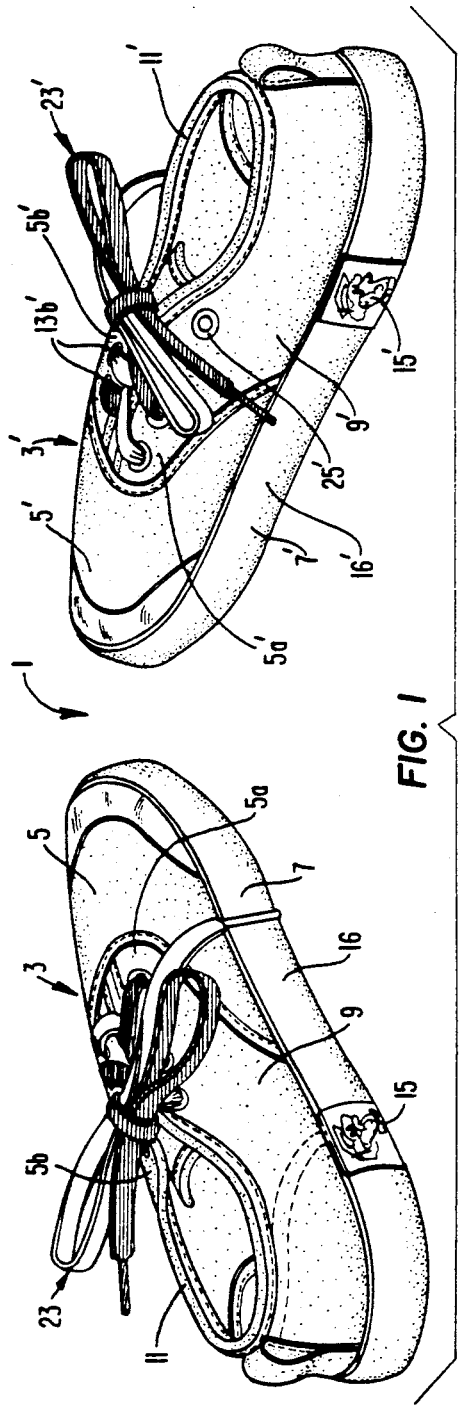
FIG. 1 is a rear perspective view of a pair of educational footwear in accordance with the present invention.

Referring to FIG. 1 there is illustrated a preferred embodiment of a pair of educational footwear in the form of athletic shoes for children, generally designated as 1, in accordance with the present invention. The pair of educational shoes 1 consists of a left shoe 3 shaped to fit the left foot of a child and a right shoe 3' shaped to fit the right foot of the child. For purposes of the present description, left shoe 3 and right shoe 3' are identical but mirror images of one another in all respects, except where noted otherwise. Therefore, only the construction of left shoe 3 will be discussed in full detail below, and with the exceptions noted below, each of the features described in connection with left shoe 3 will also be found on right shoe 3' and will be indicated as such by using the same reference numeral followed by a "'" symbol.

Left shoe 3 includes upper portion 5, bottom portion 7, medial portion 9 and lateral portion 11. As used herein, "medial" portion refers to the instep of the footwear which is that portion of an item of footwear which faces the other item of footwear when the pair of footwear is properly juxtaposed for wearing. "Lateral" portion as used herein refers to that portion of an item of footwear which is opposite to the medial portion, that is, that portion of an item of footwear which faces away from the other item of footwear when the pair of footwear is properly juxtaposed for wearing. In other words, on left shoe 3, the medial portion 9 is the right side portion of the shoe, and the lateral portion 11 is the left side portion of the shoe. For right shoe 3', the medial portion 9' is the left side portion of the shoe while the lateral portion 11' is the right side portion of the shoe. In a preferred embodiment of the present invention, bottom portion 7 is similar to a conventional sole found on most types of athletic footwear, and consists of a sole, not shown, and a foxing tape 16 disposed around the bottom peripheral edge of the shoe as is generally known in the art. Disposed on right or medial flap 5a of left shoe 3 is a row of lacing eyelets 13a which opposes a similar row of lacing eyelets 13b disposed on left or lateral flap 5b. Although, as indicated in the figures, each of rows 13a and 13b have four lacing eyelets, it will be readily understood to one of ordinary skill in the art that each row may include any number of lacing eyelets. Typically, however, each lacing eyelet in row 13a will have an opposed lacing eyelet in row 13b.

Disposed on the medial portion 9 of left shoe 3 is an indicia 15, preferably affixed to the medial side of the foxing tape 16. A similar indicia 15' is located on the medial portion 11' of right shoe 3', again, preferably on the medial side of the foxing tape 16'. For dress shoes and other types of footwear that do not employ a foxing tape, the indicia 15 and 15' may be placed in any other convenient location on the medial portions of the footwear so that when the footwear is arranged with the left item of footwear on the left and the right item of footwear on the right, as shown in FIG. 1, the indicia 15 and 15' will oppose one another. Consequently, in order for a child to properly align the left shoe 3 and the right shoe 3' of the present invention before placing them on his feet, the child need only align the left shoe 3 and the right shoe 3, so that the indicia 15 and 15' oppose one another whereby the left shoe 3 will always be on the left and the right shoe 3, will always be on the right. Such procedure does not require the child to recognize the subtle differences between the left shoe and right shoe, nor does it require the child to understand symmetry or directionality concepts. As a result, the child need not possess these intellectual capabilities in order to put the shoes of the present invention on the appropriate feet. In accordance with this feature of the present invention, the indicia 15 and 15' will always be visible to the child, even when the child is wearing the pair of shoes 1. However, the indicia 15 and 15' would not generally be visible to others. Thus, whenever the child looks at his pair of shoes 1, he will be reminded that when the indicia 15 and 15' oppose one another, he has put the correct shoe on the correct foot. On the contrary, if the indicia 15 and 15' do not oppose one another after the child has put on his shoes, it will be readily apparent to the child that he has improperly arranged and put on his shoes and should therefore reverse them.

In applying the indicia 15 and 15' to the left and right shoes 3 and 3', a manufacturer has a great deal of freedom in choosing the particular designs which will make up the indicia. In preferred arrangements the indicia on both shoes are identical and most preferably incorporate the logo or trademark of the manufacturer. However, it should be understood that although preferred embodiments employ the same indicia 15 and 15' on both the left shoe 3 and the right shoe 3', different indicia may be employed on each shoe. For example, a "brother" face disposed on one shoe could oppose a "sister" face on the other shoe; a picture of a ball disposed on one shoe could oppose a picture of a bat disposed on the other shoe; and so forth.

Figure 2:
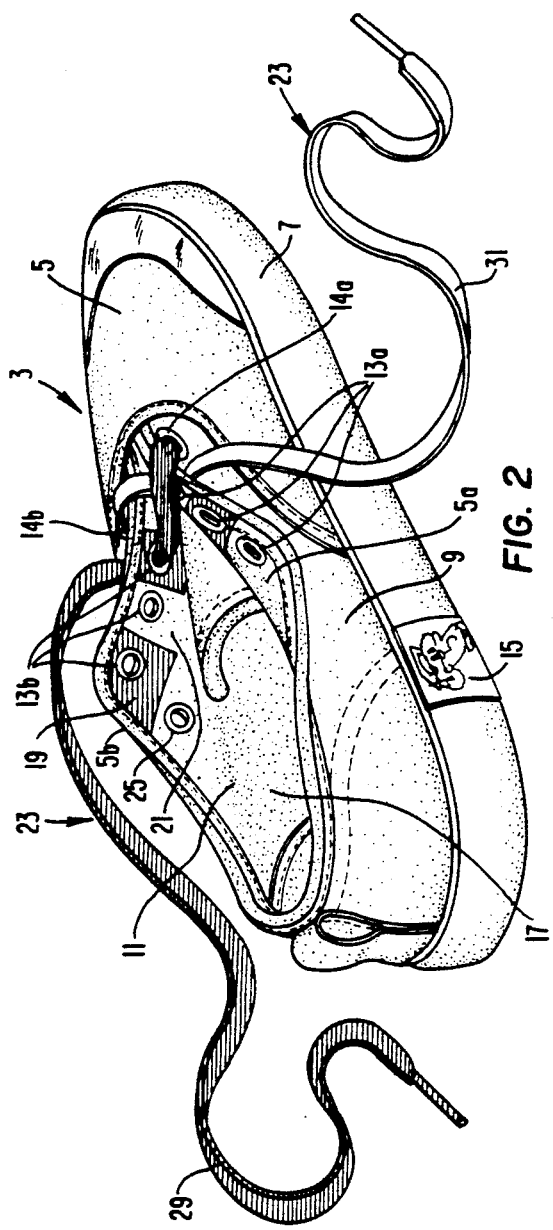
FIG. 2 is a side perspective view of the left educational footwear shown in FIG. 1, partially opened to reveal the interior thereof.

Referring to FIG. 2, the left shoe 3 is shown in a partially opened view to reveal interior surface 17 thereof. Right shoe 3' has a similar interior 17' (not shown). Located on each of medial flap 5a and lateral flap 5b about each individual eyelet in rows 13a and 13b on interior surface 17 are alternating first and second colored patches 19 and 21. In preferred embodiments of the present invention, these colored patches 19 and 21 comprise a part of the interior surface 17 of the shoe 3, or comprise a tape which is applied to interior surface 17 contiguous with rows of eyelets 13a and 13b. The left shoe 3 further includes a bi-colored shoelace 23, shown fully in FIG. 4, having a first portion 29 formed with one color and a second portion 31 formed with a different color. Preferably, the two colors used for forming shoelace 23 are the same as the colors used for forming patches 19 and 21. The first portion 29 of shoelace 23 will therefore be the same color as patch 19, while the second portion 31 of shoelace 23 will be the same color as patch 21. The colors of the shoelace 23 and of the patches 19 and 21 thus act as a guide to teach young children how to lace their shoes. In order to lace left shoe 3, a child will first thread first portion 29 of shoelace 23 through the frontmost eyelet 14a in row 13a which will be surrounded by the colored patch 19. The second portion 31 of shoelace 23 will then be threaded through the opposed eyelet 14b in row 13b which will have colored patch 21 thereabout. An approximate centering of the shoelace between frontmost eyelets 14a and 14b will automatically be accomplished by sleeve 24, shown clearly in FIG. 4. As described more fully below, sleeve 24, which is assembled to shoelace 23 during the construction thereof, is either sized or configured so that it will not pass through any of the eyelets in rows 13a or 13b. Thus, sleeve 24 is either larger in diameter than these eyelets, or has a geometric configuration, such as a triangle, a square, an ellipse, etc., which will not permit it to pass through the eyelets. The child will then repeat the lacing process, alternately threading portion 29 of shoelace 23 through the eyelets having colored patches 19 thereabout, and portion 31 of shoelace 23 through the eyelets having colored patches 21 thereabout until all of the eyelets have been laced. The child will subsequently perform the same process as described above for lacing right shoe 3' with a similar shoelace 23'. It should be noted that other corresponding lacing schemes could be employed to guide the child through the lacing process, such as, for example, color coding the grommets which define the lacing eyelets in rows 13a and 13b themselves, or forming each tip of the shoelace with a different geometric shape for threading through similarly shaped eyelets.

Referring to FIGS. 3A-3E, right shoe 3' is shown in various stages to illustrate the steps required to tie a single bowknot in accordance with the present invention. Although the tying process is shown in connection with right shoe 3', it will be readily apparent that the same process may be used for tying the shoelace of left shoe 3 with a single bowknot. Moreover, it will be readily understood to those of ordinary skill in the art that similar processes may be employed with the shoes of the present invention to tie the shoelaces with different knot configurations.

Figure 3A:
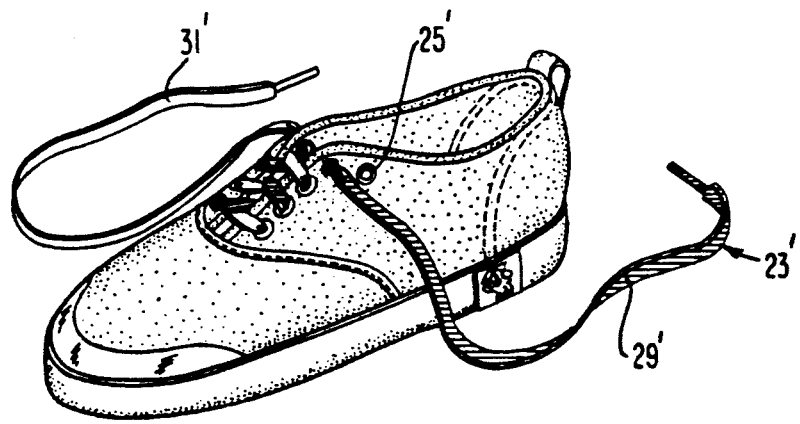
FIGS. 3A-3E are perspective views of the pair of educational footwear of FIG. 1 showing the steps required to tie a single bowknot in accordance with the present invention.
Figure 3B:
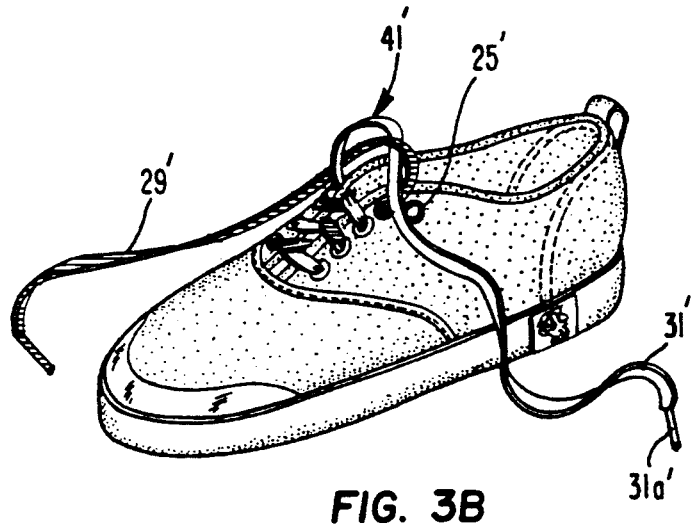
Figure 3C:
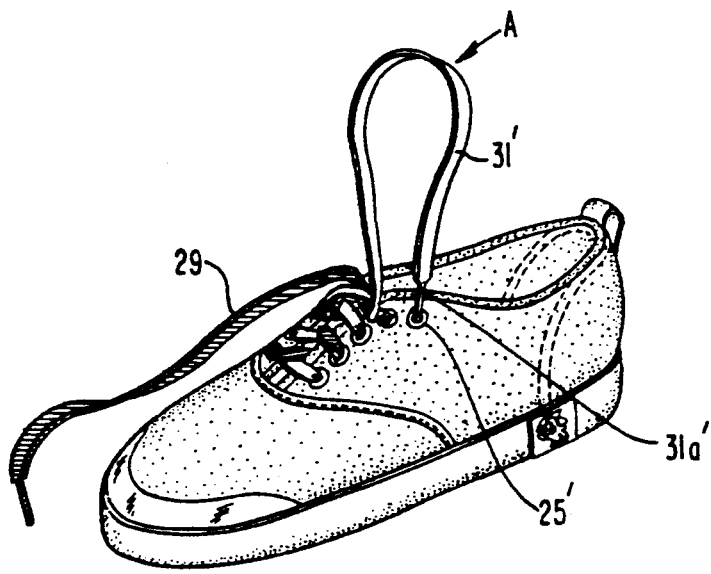

Turning to FIG. 3A, right shoe 3' is shown after it has been laced with shoelace 23'. To tie shoelace 23' to form a single bowknot, a child must first cross end portion 31' over and then under end portion 29' to thereby form half-knot 41' as shown in FIG. 3B, tightening half-knot 41' by pulling the end portions 31' and 29' in opposite directions. Subsequently, as shown in FIG. C, the child forms a first loop A by inserting tip 31a' of end portion 31' into a retaining means in the form of aperture 25'. Thus, loop A will be held in place with the assistance of aperture 25' so that the child will not have to use either of his hands to keep loop A properly configured. Preferably, aperture 25, comprises an additional non-lacing eyelet sized and shaped to snugly receive tip 31a' and retain same in place, but sufficiently loose so as to release tip 31a' when end portion 31' is tugged on, as described more fully below. In highly preferred embodiments, aperture 25' is formed on upper portion 5' on the medial side of right shoe 3' and the upper portion 5 on the lateral side of left shoe 3. While aperture 25' provides a preferred means for holding tip 31a' and thus loop A in place due to its simple configuration and easy manufacture, the present invention contemplates that other configurations may be used to accomplish the same task. For example, a small clasp, loop of fabric, or Velcro connector may take the place of aperture 25' to receive tip 31a ' and hold same in place.

Figure 3D:
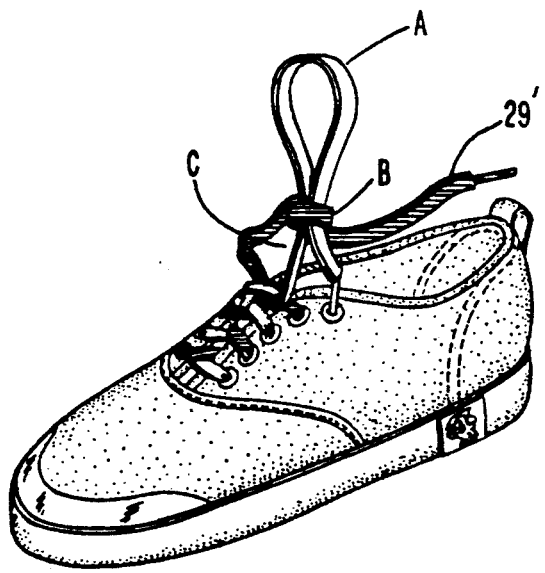
Figure 3E:
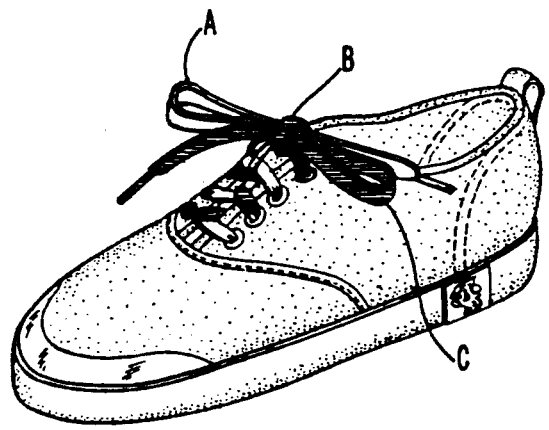

While tip 31a' is retained in aperture 25', both hands of the child are free to complete the remaining difficult task of tying the shoelace to form a single bowknot. After the formation of loop A, the child wraps end portion 29' around loop A to form intermediate loop B, also as shown in FIG. 3D. Third loop C may then be formed by pushing an intermediate section of end portion 29' through intermediate loop B as shown in FIG. 3D. In the final step, the child pulls loops A and C in opposite directions to tighten intermediate loop B and thereby form a single bowknot in accordance with the present invention. When a preferred retaining means such as aperture 25' is used, the act of pulling loops A and C in opposite directions to tighten the bowknot will remove tip 31a' from the retaining means.

Figure 4:
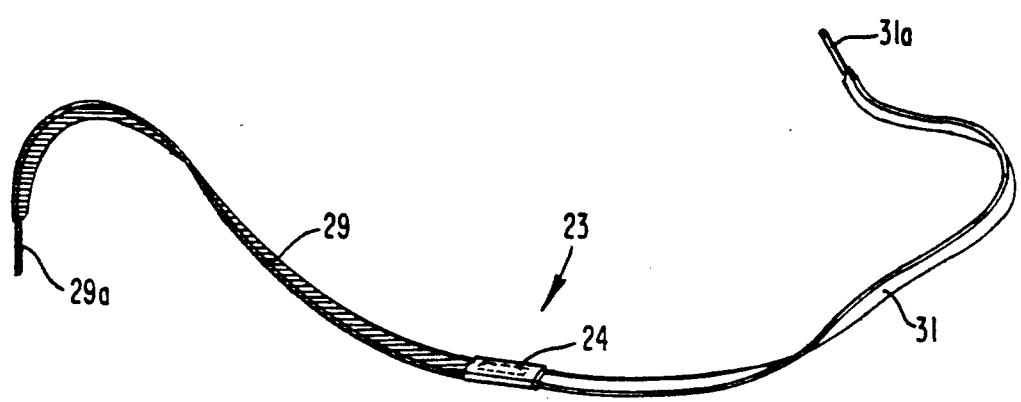
FIG. 4 is a perspective view of the lace used in conjunction with the educational footwear of the present invention.

As can be seen in FIG. 4, shoelace 23 is preferably bi-colored, end portion 29 being formed with one color and end portion 31 being formed with a different color. Shoelace 23' is formed in a similar manner. Thus, shoelaces 23 and 23' are specifically adapted for use with the lacing system of the instant invention as described above and as shown in FIG. 2. Various methods are extant for fabricating the bi-colored shoelaces for use in the present invention. These methods include forming the shoelaces by joining together two lengths of differently colored fabric and subsequently forming tips on the free ends thereof, or merely coloring at least one end portion of the shoelace to be a different color than the other end by silk screening, dying or some other coloring process. In a preferred method for forming these shoelaces, two shoelaces of different colors, each having tips formed thereon, are cut in half and the differently colored halves are joined together. This last described method is preferred since it provides a shoelace which has the feel and appearance of a shoelace for adults, thereby making it more appealing to children.

Regardless of the method employed for forming shoelaces 23 and 23', each shoelace must be formed with a sleeve 24 assembled at the center thereof. Sleeve 24 may consist of a strip of a pliant material wrapped around the shoelace and secured in place by glueing, sewing, stapling or otherwise, or may be formed from a metal or plastic sleeve either clamped or threaded onto the shoelace. In the preferred method for forming the shoelaces described above, the assembly procedure is preferably carried out by arranging the halves so that the cut ends are adjacent one another, wrapping a strip of a pliant material around the joint to form a sleeve which overlaps the cut ends, and then sewing or gluing the sleeve to hold the assembly together. As noted above, sleeve 24 is either sized or shaped so that it will not pass through eyelets 14a and 14b. Thus, as first portion 29 of shoelace 23 is threaded through eyelet 14a and second portion 31 of shoelace 23 is threaded through eyelet 14b, shoelace 23 will be more or less centered between rows of eyelets 13a and 13b automatically, making it easier for a child to complete the lacing process.

It is important to note that all of the features described above which help children learn how to put items of footwear on the proper foot, properly lace the footwear and tie the laces with a single bowknot are incorporated into the footwear in an inconspicuous manner. Thus, it will appear to one who observes a child wearing the footwear of the present invention that the child is actually wearing an ordinary pair of footwear. This is an important consideration since all children want to "fit in with the crowd". Hence, if the footwear looked differently than an ordinary pair of footwear, children would be reluctant to wear them. By making all of the learning features of the footwear described herein inconspicuous, parents will be assured that their children will not resist wearing the footwear because they look different.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. A pair of educational footwear for a child comprising a right item of footwear shaped to fit the right foot of said child and a left item of footwear shaped to fit the left foot of said child, each of said right and left items of footwear having an upper portion, a bottom portion, an instep portion and a lateral portion, and indicia means disposed on said instep portions on an exterior region of said items of footwear whereby said indicia means visibly oppose one another when said right item of footwear and said left item of footwear are properly aligned with said left item of footwear on the left and said right item of footwear on the right.

2. A pair of educational footwear as claimed in claim 1 wherein each of said right and left items of footwear further comprises a lower sole secured to said bottom portion and having a peripheral exterior surface, and wherein said indicia means is visibly disposed on said peripheral exterior surface.

3. A pair of educational footwear for a child comprising a right item of footwear shaped to fit the right foot of said child and a left item of footwear shaped to fit the left foot of said child, each of said right and left items of footwear having an upper portion, a bottom portion, an instep portion, a lateral portion, a plurality of opposed lacing eyelets formed on said upper portion, a lace threadedly engaged through said plurality of opposed lacing eyelets and having first and second tips, and retaining means for removably receiving one of said first and second tips of said lace to form a loop to thereby assist said child by retaining said loop while said child ties said lace with a bowknot.

4. A pair of educational footwear as claimed in claim 3 wherein said retaining means for removably receiving said one of said first and second tips of si lace is disposed on said instep portion of said right time of footwear and said lateral portion of said left item of footwear.

5. A pair of educational footwear as claimed in claim 3 wherein said retaining means comprises an aperture sized and shaped to snugly receive said one of said first and second tips of said lace.

6. A pair of educational footwear for child comprising a right item of footwear shaped to fit the right foot of said child and a left item of footwear shaped to fit the left foot of said child, each of said right and left items of footwear having an upper portion, a bottom portion, an instep, portion, a lateral portion, a plurality of opposed lacing eyelets formed on said upper portion, a lace threadedly engaged through said plurality of opposed lacing eyelets and having first and second tips, indicia means disposed on said instep portions on an exterior region of said items of footwear whereby said indicia means visibly oppose one another when said right item of footwear and said left item of footwear are properly aligned with said let item of footwear on the left and said right item of footwear on the right, and retaining means for removably receiving one of said first and second tips of said lace to form a loop to thereby assist said child by retaining said loop while said child ties said lace with a bowknot.

7. A pair of educational footwear as claimed in claim 6 further comprising a sleeve assembled at about the center of said lace, and wherein said plurality of opposed lacing eyelets are formed with a predetermined size and said sleeve is sized and shaped to not pass through said plurality of eyelets.

8. A pair of educational footwear as claimed in claim 6 further comprising guide means including first corresponding means formed adjacent said first tip of said lace and ones of said lacing eyelets and second corresponding means formed adjacent said second tip of said lace and others of said lacing eyelets for teaching said child how to lace said right nd left items of footwear with said lace.

9. A pair of educational footwear as claimed in claim 6 wherein said retaining means for removably receiving said one of said first and second tips of said lace is disposed on said instep portion of said right item of footwear and said lateral portion of said left item of footwear.

10. A pair of educational footwear as claimed in claim 6 wherein said retaining means comprises an aperture sized and shaped to snugly receive said one of said first and second tips of said lace.

11. A pair of educational footwear for a child comprising a right time of footwear shaped to left the right foot of said child and a left item of footwear shaped to fit the left foot of said child, each of said right and left items of footwear having an upper portion, a bottom portion, an instep portion, a lateral portion, a plurality of opposed lacing eyelets formed on said upper portion, a lace threadedly engaged through said plurality of opposed lacing eyelets and having first and second tips and a centrally disposed sleeve sized and shaped not to pass through said plurality of opposed lacing eyelets, indicia means disposed on said instep portions on an exterior region of said items of footwear whereby said indicia means visibly oppose one another when said right item of footwear and said left item of footwear are properly aligned with said left item of footwear on the left and said right item of footwear on the right, and retaining means for removably receiving one of said first and second tips of said lace to form a loop to thereby assist said child by retaining said loop while said child ties said lace with a bowknot.

12. A pair of educational footwear as claimed in claim 11 wherein said plurality of opposed lacing eyelets have a first geometric shape and said sleeve has a second geometric shape different than said first geometric shape.

13. A pair of educational footwear as claimed in claim 11 wherein said retaining means for removably receiving said one of said first and second tips of said lace is disposed on said instep portion of said right item of footwear and said lateral portion of said left item of footwear.

14. A pair of educational footwear as claimed in claim 11 wherein said retaining means comprises an aperture sized an shaped to snugly receive said one of said first and second tips of said lace 15. A pair of educational footwear for child comprising a right item of footwear shaped to fit the right foot of said child and a left item of footwear shaped to fit the left foot of said child, each of said right and left items of footwear having an upper portion, a bottom portion an instep, portion, a lateral portion, a plurality of opposed lacing eyelets formed on said upper portion, a lace threadedly engaged through said plurality of opposed lacing eyelets and having first and second tips and a centrally disposed sleeve sized and shaped to not pass through said plurality of opposed lacing eyelets, guide means including first corresponding means formed adjacent said first tip of said lace and ones of said lacing eyelets and second corresponding means formed adjacent said second tip of said lace and other of said lacing eyelets for teaching said child how to lace said right and left items of footwear with said lace, indicia means disposed on said instep portions on an exterior region of said items of footwear whereby said indicia means visibly oppose on another when said right item of footwear nd said left item of footwear are properly aligned with said left item of footwear on the left and said right item of footwear on the right, and retaining means for removably receiving one of said first and second tips of said lace to form a loop to thereby assist said child by retaining said loop while said child ties said lace with a bowknot.

16. A method for tying first and second end portions of said lace in an item of educational footwear to form a bowknot, said item of footwear having an upper portion including retaining means for removably receiving a tip on one of said first and second end portions of said lace, said method comprising the steps of:
  a. crossing said first ned portion of said lace over and then under said second end portion of said lace to form a half-knot;
  b. pulling said first and second end portions of said lace in opposite directions to tighten said half-knot;
  c. removably assembling said tip on one of said first and second end portions of said lace to said retaining means to form a first major loop;
  d. wrapping another of said first and second end portions of said lace around said first major loop to thereby form an intermediate loop;
  e. inserting an intermediate section of said another of said first and second end portions of said lace through said intermediate loop to form a second major loop; and
  f. pulling said first and second major loops in opposite directions to tighten said intermediate loop.

17. The method for typing first and second end portions of a lace to form a bowknot as claimed in claim 16 wherein said step of pulling said first and second major loops in opposite directions disassembles said tip form said retaining means.

18. A method for putting on a par of footwear, each of said pair of footwear having an instep portion and indicia means disposed on said instep portion an exterior region of said footwear, said method comprising the steps of:
  a. aligning said pair of footwear so that said indicia means visibly oppose one another with one of said pair of footwear on the right and the other of said pair of footwear on the left;
  b. inserting a right foot of said child into said one of said pair of footwear on the right; and
  c. inserting a left foot of said child into said other of said pair of footwear on the left.

19. A method for putting on a pair of educational footwear and tying first and second end portions of sa lace in each of said pair of footwear to form a bowknot, each of said pair of footwear including an instep portion, indicia means disposed on said instep portion on an exterior region of said footwear, and retaining means for removably receiving a tip on one of said first and second end portion of said lace, said method comprising the steps of:

a. aligning said pair of footwear so that said indicia means visibly oppose one another with one of said pair of footwear on the right and the other of said pair of footwear on the left;
b. inserting a right foot of said child into said one of said pair of footwear on the right;
c. inserting a left foot of said child into said other of said pair of footwear on the left;
d. crossing said first end portion of said lace over and then under said second point of said lace to form a half-knot;
e. pulling said first and second end portions of said lace in opposite directions to tighten said half-knot;
f. removably assembling said tip on one of said first and second end portions of said lace to said retaining means to form a first major loop;
g. wrapping another of said first and second end portions of said lace around said first major loop to thereby form an intermediate loop;
h. inserting an intermediate section of said another of said first and second end portions of said lace through said intermediate loop to form a second major loop and
i. pulling said first and second major loops in opposite directions to tighten said intermediate loop.

* * * * *

UNITED STATES PATENT AND TRADEMARK OFFICE
CERTIFICATE OF CORRECTION

PATENT NO. : 5,240,418          Page 1 of 2

DATED : August 31, 1993

INVENTOR(S) : Jeffrey Silverman and Diane Wanamaker

It is certified that error appears in the above-identified patent and that said Letters Patent is hereby corrected as shown below:

Col. 7, lines 7 and 9, "3" should be --3'--.

Col. 8, line 50, "25," should be --25'--.

Col. 10, line 467, "si" should be --said--.

Col. 11, claim 8, line 16, "nd" should be --and--.

Col. 11, claim 14, line 62, "nd" should be --and--.

Col. 11, claim 15, line 68, after "portion" insert a comma.

Col. 12, claim 15, line 1, after "instep" delete the comma.

Col. 12, claim 15, line 10, "other" should be --others-.

Col. 12, claim 15, line 15, "on" should be --one--.

Col. 12, claim 15, line 16, "nd" should be --and--.

Col. 12, claim 16, line 24, "said" should be --a--.

Col. 12, claim 16, line 29, "ned" should be --end--.

Col. 12, claim 17, line 49, "form" should be --from--.

Col. 12, claim 18, line 51, "par" should be --pair--.

Col. 12, claim 18, line 53, after "portion" insert --on--.

Col. 12, claim 19, line 65, "sa" should be --said--.

UNITED STATES PATENT AND TRADEMARK OFFICE
CERTIFICATE OF CORRECTION

PATENT NO. : 5,240,418

DATED : August 31, 1993

INVENTOR(S) : Jeffrey Silverman and Diane Wanamaker

It is certified that error appears in the above-identified patent and that said Letters Patent is hereby corrected as shown below:

Col. 13, claim 19, line 3, "portion" should be --portions--.

Col. 14, claim 19, line 12, after "loop" insert --;--.

Signed and Sealed this

Thirtieth Day of April, 1996

Attest:

BRUCE LEHMAN

Attesting Officer

Commissioner of Patents and Trademarks